United States Patent [19]
Kowalski et al.

[11] Patent Number: 5,789,035
[45] Date of Patent: Aug. 4, 1998

[54] METHOD FOR EXTRUDING ALIMENTARY PASTE

[75] Inventors: Raymond Gregory Kowalski. Weedsport; Carl Michael Norman. Syracuse; David Brian Bertollini. North Bay, all of N.Y.

[73] Assignee: Borden Chemical, Inc., Columbus, Ohio

[21] Appl. No.: 733,191

[22] Filed: Oct. 17, 1996

Related U.S. Application Data

[62] Division of Ser. No. 380,996, Jan. 31, 1995, abandoned.
[51] Int. Cl.[6] ............................................ A23L 1/00
[52] U.S. Cl. .................... 426/516; 426/451; 426/557
[58] Field of Search ........................... 426/516, 517, 426/557, 451, 448, 449

[56] References Cited

U.S. PATENT DOCUMENTS

| | | | |
|---|---|---|---|
| 3,038,202 | 6/1962 | Harkenrider | 425/464 |
| 3,761,553 | 9/1973 | Richardson | 425/141 |
| 4,281,980 | 8/1981 | Hoagland et al. | 425/461 |
| 4,376,623 | 3/1983 | Robinson et al. | 425/143 |
| 4,614,489 | 9/1986 | Juravic | 425/370 R |
| 4,830,595 | 5/1989 | Bentivoglio et al. | 425/143 |
| 4,871,493 | 10/1989 | Goto | 264/40.6 |
| 4,882,104 | 11/1989 | Dobrowsky | 264/40.1 |
| 4,886,438 | 12/1989 | Borger et al. | 425/141 |
| 4,965,082 | 10/1990 | Chawan et al. | 426/331 |
| 5,089,284 | 2/1992 | Irvin et al. | 426/516 |

OTHER PUBLICATIONS

1985 Derwent Publications Ltd., London, England, 84–296891/48 MATSUSHITA ELEC IND KK. Jan. 4, 1983—JP–058119, MATU Jan. 4, 1983 J 9182–706–A. (Oct. 17, 1984) B29c–01 (C84–126059) Abstract (Partial Translation).

*Primary Examiner*—George Yeung
*Attorney, Agent, or Firm*—Watson Cole Stevens Davis, P.L.L.C.

[57] ABSTRACT

A method and apparatus for increasing pasta production and for ensuring a more uniform and quality pasta product which includes heating the die face of a die by positioning on the die face an electric resistance heater.

5 Claims, 3 Drawing Sheets

METHOD FOR EXTRUDING ALIMENTARY PASTE

This application is a division of application Ser. No. 08/380,996 filed Jan. 31, 1995 which application is now: abandoned.

FIELD OF THE INVENTION

The present invention relates to a device for heating a die face and an improved method for making pasta.

BACKGROUND OF THE INVENTION

Though pasta and its production are attributed to the Chinese hundreds of years ago, the industry can be thought of as being in its infancy. Until recently, in the United States and elsewhere, the industry has been dominated by "Mom and Pop"-type facilities using age-old methods and recipes handed down over generations through families.

The industry today has evolved to the extent that multi-national corporations are producing the majority of the pasta consumed in North America and most probably in Europe. These multinational companies with funds for conducting research are now more fully recognizing the chemistry and the dynamics of pasta production on a large or a mass scale.

Such production involves using extruders having screws for conveying large quantities of alimentary paste to die faces that are up to and greater than ten feet long for shaping the paste. The die faces are expensive to manufacture and are composed primarily of brass alloys having a plurality of uniformly shaped machined or molded orifices for producing pasta such as lasagna, spaghetti, linguine, vermicelli, ziti, fusilli, fettuccine, radiatore, rigatoni, etc.

One of the recognized problems of pasta production is the uneven extrusion of the pasta. Currently, in order to successfully extrude the alimentary paste through a die, the paste is conveyed by the screw to a header that distributes the paste to a plurality of branched-ports or barrels located behind the die face and in front of the screw. Some of the molded orifices of the die are positioned immediately in front of the ports, other orifices are positioned to the right or left of the port. During extrusion it is observed that alimentary paste extruded over the length of the die face does not extrude evenly. In fact, alimentary paste extruded from die faces located immediately in front of the ports extrudes faster than the paste further away from the ports.

As shown in FIG. 1, the result of this uneven extrusion defines a periodic wave at the lead end of the extrusion. Greater lengths of paste 10 are extruded from die orifices (primary orifices) immediately in front of conveying branch ports. Paste extruded through such primary orifices extrudes at a greater rate than paste extruded from orifices adjacent to such primary orifices (secondary orifices), and at greater rates than being extruded through tertiary orifices even further removed from conveying branch ports. The result is that the lead ends of the extruded paste will develop a tapered profile of ever shorter extruded lengths of paste 12 until the paste extruded from a second series of orifices is influenced by a second branch port. The uneven extrusion results in sinewave defined by the broken line 14. The uneven lengths are undesired as consumers favor a uniform product and because it is always easier to dry and further process paste of uniform length.

Because the uneven lengths are not desired it is necessary to sever the uneven length and return the extruded paste to a hopper above the screw. Reusing such alimentary paste saves money but creates a less than perfect food product. A better quality product is prepared by not recycling the excess or cut-off lengths of paste. Eliminating such a step also reduces production costs.

The present invention recognizes that longer length paste 10 is being extruded faster than the shorter length paste 12 because extruded paste nearest a branch port is warmer than paste removed in distance from such a port.

The inventor hypothesized that uniformly heating the die face would improve uniformity of paste extrusion, thus overcoming the problems identified above.

It is known to heat dies by embedding heaters in the die body, as disclosed in U.S. Pat. Nos. 5,192,543 and 5,089,284 herein incorporated by reference. Such devices also include die orifices which are both coated and uncoated, delaying and facilitating heat transfer to the alimentary paste. It is also known to externally heat various surfaces other than the die face itself—see U.S. Pat. No. 4,871,493. Although these devices work satisfactorily, they are quite expensive to fabricate and mainitain. For instance, the device disclosed in U.S. Pat. Nos. 5,192,543 and 5,089,284 requires machining holes in the die for receiving electrical resistance heaters. The present invention overcomes these limitations.

SUMMARY OF THE INVENTION

The present invention in its broadest aspects relates to maintaining the mass of a die face at a uniform temperature over its entire length or surface area to ensure that lengths of alimentary paste are extruded in uniform lengths. The invention also relates to apparatus in association with the die mass. In the preferred embodiment of the invention, the die face is uniformly heated by a heating plate in heat exchange relation with the die mass to create uniform paste lengths. The present invention also relates to heating paste after it has assumed a specific shape and the shape remains fairly constant. In this manner the paste becomes more fluid and increases extrusion rates.

DETAILED DESCRIPTION OF THE INVENTION

Pasta is prepared by shaping an "alimentary paste" or dough which is a glutinous flour and water mixture. Alimentary pastes or doughs are generally made from coarse, hard flours obtained from hard wheat such as the middlings of durum wheat, often referred to as "semolina flour" or "semolina". In addition, fine flours such as durum flour, wherein 98 weight percent passes through a 70 mesh sieve, are also suitable and are intended to fall within the scope of the term "glutinous flour". The only requirement for the flour is that it provide a self supporting paste.

A typical alimentary paste used to prepare pastas suitable for the present invention comprises, based on the weight of uncooked pasta, between about 67.0% and 80.0% by weight (solids basis) of semolina flour (having an inherent moisture content of between about 10% and 15% and preferably between about 11% and about 14% by weight, and a protein content of between about 11% and about 14% by weight), the balance being optional additives and added water.

More specifically, a suitable paste may be prepared from 10 kg fancy durum patent flour and about 2200 grams of added water; a lower moisture formulation may be prepared by adding about 1500 grams of added water to the same amount of flour.

The paste may contain additives including release agents such as glycerol monostearate, a sulfhydryl reducing agent and added vitamins, e.g. B-vitamins and eggs.

Water can be introduced in the form of ice before or during extrusion, to prevent swelling of the paste during extrusion. The water, or moisture, content is preferably between about 20.0% and about 30.0% by weight of the paste. In this application, water or moisture content refers to total moisture, that is, inherent moisture, or moisture naturally present in the flour and other ingredients, as well as added water. The term "water" as used herein includes water in all physical states, i.e., steam, ice or liquid water, or mixtures thereof.

The flour, water and any additives used may be mixed in any way conventional in the art, such as by mixing in a vertical cutter mixer (e.g. a Hobart Cutter/Planetary Mixer) for approximately one minute, at which time the pasta dough is ready for extrusion in any of the conventional pasta shapes. Alternatively, the components of the paste may be separately introduced into an extruder without prior mixing. After extrusion the created pasta shapes are then preferably subjected to a drying step.

Figure 1:
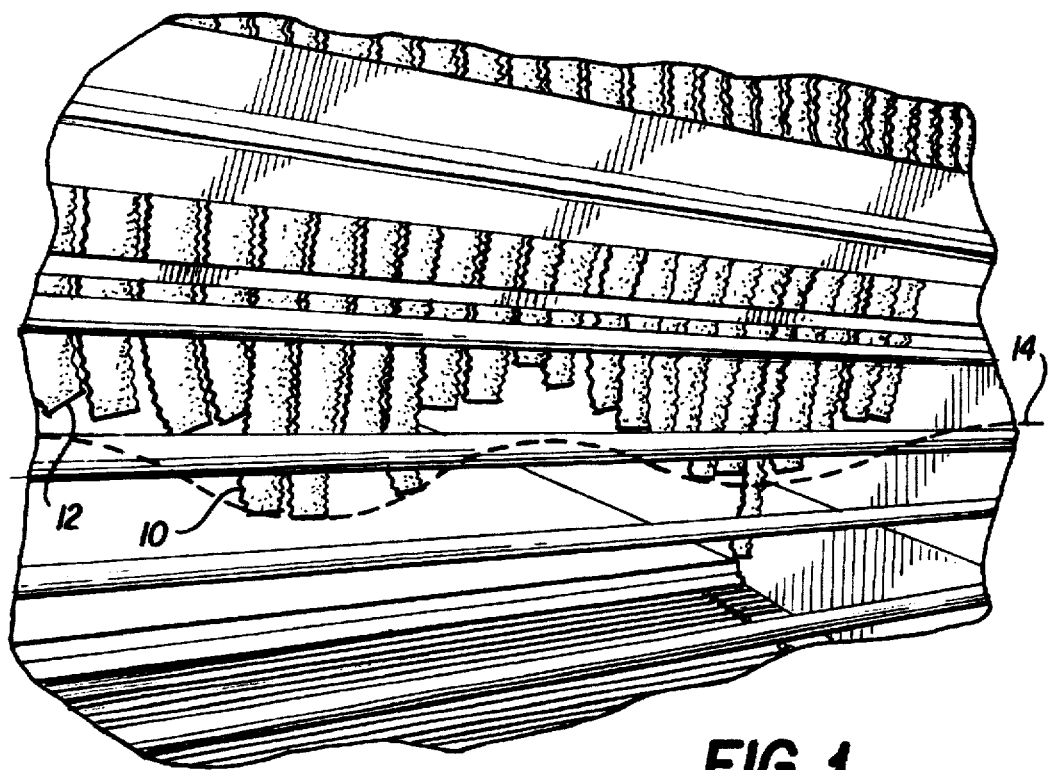
FIG. 1 is a prior art illustration of extruded alimentary paste having the shape of lasagna. The paste is not extruded uniformly.
Figure 2:
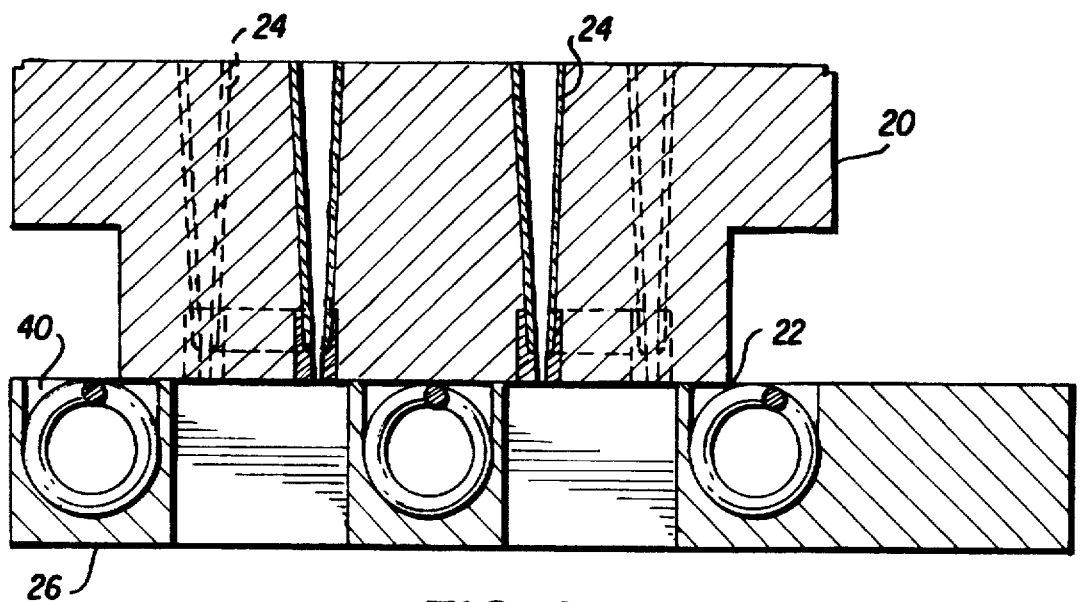
FIG. 2 is a side sectional view of a die showing, in phantom and otherwise, lands having progressively smaller cross-sections in the direction of extrusion.
Figure 3:
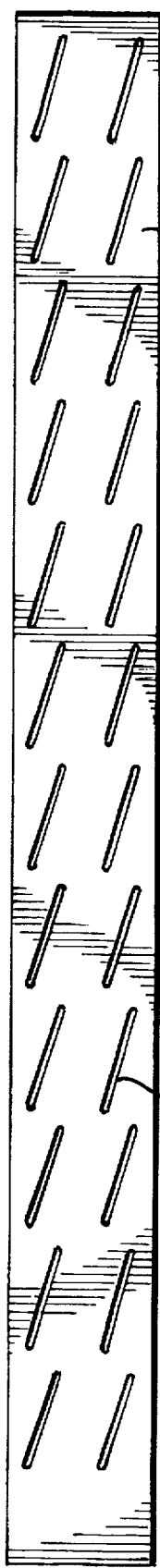
FIG. 3 is a front view of an elongated die face having a multitude of extruding orifices.
Figure 5:
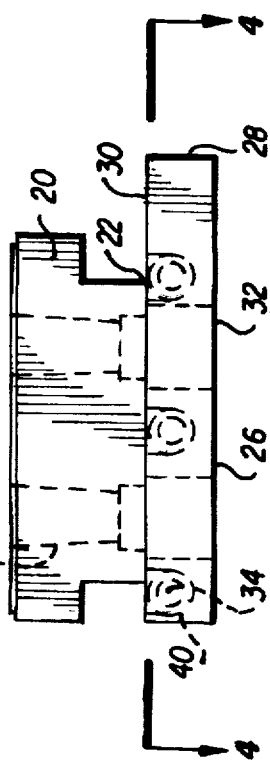
FIG. 5 is an end side view of the die face and the die heating plate of the invention in heat exchange relation. This view also shows a device with lands having a uniform cross section.

Shaped pasta is prepared from the paste by extrusion. Extrusion can be performed with any acceptable extruder whose die face is modified in accordance with the invention. The alimentary paste is fed into the extruder wherein it may, optionally, be blended, in the case of a screw-type extruder, or further blended, if the feedstock was premixed before being fed into the extruder, and then forced by internal pressure through the channels or lands of a die face having a plurality of orifices forcing the paste to conform to a desired shape. The orifices of the die face are defined by the openings of through lands or channels in the die head. The cross sections of the lands may decrease, e.g. in stepwise fashion, in the direction of extrusion as shown in FIG. 2 or may have a uniform cross-section as shown in FIG. 5. The shapes of the orifices on the die face determine the profile of the extruded pasta shape. Such shapes include spaghetti, fettucine, linguine, rotini, elbows, spirals, shells, ziti, vermicelli, fusilli, tortellini, ravioli, manicotti, lasagna, rote, tortiglioni, or the like. The die face shown in FIG. 3 is used to prepare lasagna.

The alimentary paste passes through the die due to internal pressure generated by a rotating screw or screws. Suitable screw speeds range from about 3.5 to 35 revolutions per minute (rpm), and preferably about 20 rpm to 23 rpm. A particularly optimal screw speed is about 25 rpm. In general, screw speeds in excess of about 30 rpm appear to result in a compromised texture and increased starch loss in the pasta product, whereas screw speeds of less than about 3.5 rpm render the extrusion process economically unfeasible.

The screw speed is chosen to result in an extrusion rate, for example, in the range of about 50 grams per minute (g/min) (6.6 lb/hr) to about 500 g/min (66 lb/hr) or greater, preferably about 175 g/min (23 lb/hr), based on, a six-orifice die having approximately two inch deep or long lands.

Optimized extrusion rate appears to be correlated to, inter alia, die temperature, barrel temperature, port temperature and screw speed. For example, at a screw speed of 3.5 rpm and at barrel and port temperatures of 110° F. and 120° F., respectively, acceptable extrusion rates on a six-orifice die of 62 and 55 g/min result. Whereas, at 110° F. and 10.5 rpm, an acceptable extrusion rate of 175 g/min occurs.

Vacuum pressure may or may not be used. If used, a vacuum of about 40 cm Hg to about 60 cm Hg preferably about 40 cm Hg may be used.

As shown in FIG. 3 and FIG. 5, the commercial extrusion dies in the alimentary paste art are elongated structures and quite massive, and expensive to produce. The die 20 and its face 22 are fabricated from brass. The die face of FIG. 3 is about 37 inches long; it has a width of about 4 inches. The die has a thickness of about 1 ½ inches, and a mass of about fifty pounds. Die face 22 has a plurality of extrusion lands or channels 24, the lands may or may not be of a uniform cross section. As shown in FIG. 2, the lands 24 may have progressively smaller cross sections in the direction of extrusion or, as shown in FIG. 5, the cross sections of the lands may be uniform. The lands terminate or define orifices 25 (FIGS. 3 and 6) at the front face 22 of the die 20. The inventor has now found that by maintaining a constant and uniform temperature over the mass of die face 22 so that pasta is heated at its extrusion point, i.e., at 25 (on FIG. 3) and not within the lands or channels of the die, a more uniform product in terms of length and overall composition is obtained.

Figure 6:
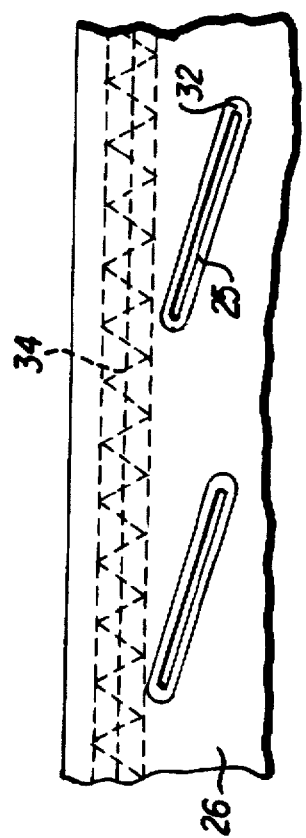
FIG. 6 is a front view of a random section of the die heating plate mounted on a face of a die.

The constant temperature over the mass of the die face 22 is maintained by die heating plate 26 shown positioned on the die face in FIGS. 2, 5 and 6.

Die heating plate 26 as shown in FIGS. 2, 3 and 5 has a thickness of preferably ¾ inch, and sides 28 for defining a depth and an open back end 30. The heating plate 26 is preferably constructed of the same metal composition as the face of the die and the die to assist in heat transfer. Specifically, if die 20 and its face 22 are constructed from brass, so too is die heating plate 26. When the compositions of the die, die face and die heating plate cannot be duplicated, the heating plate should have thermo-conductivity and expansion properties equal to or very similar to the die face and die.

The face of heating plate 26 includes machined openings 32. The arrangement and the number of openings in the die heating plate correspond in arrangement or position, shape and number to orifices 25 of the die face. Although openings 32 are similar in shape to orifices 25, they are larger, allowing extruded alimentary paste to pass therethrough without encountering the surfaces defining openings 32.

Figure 4:
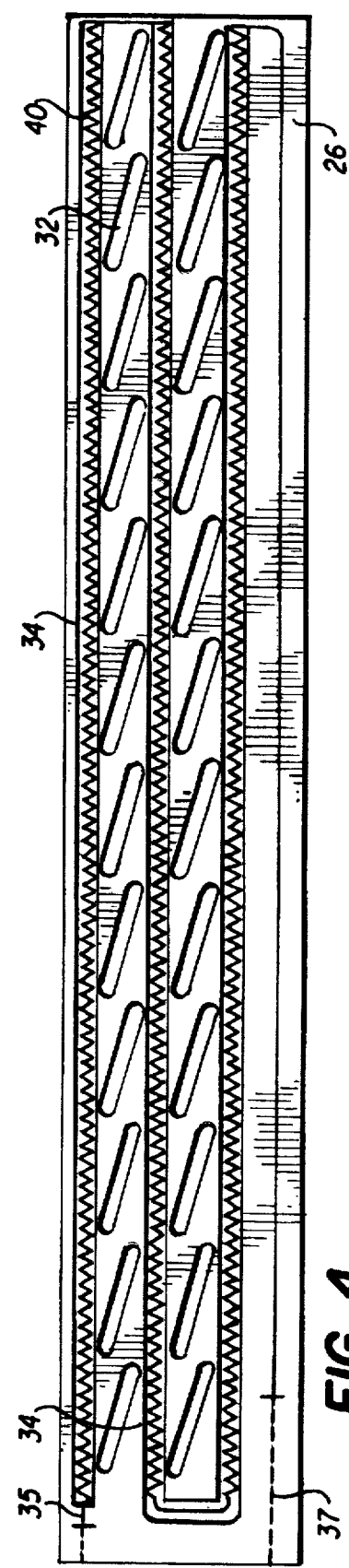
FIG. 4 is a rear plan view, taken on line 4—4 of FIG. 5 looking in the direction of the arrows shown, of the die heating plate of the invention. As shown, the die heating plate of the invention has orifices of similar shape to the orifices of the die face of FIG. 3, but are of greater dimension.

Positioned within the open back end 30 of heating die plate 26 is an electrical resistance heating coil 34. In the embodiment shown, coil 34 is composed of a nicke-chromium alloy and it is fourteen gauge. The size of the wire is not critical but it must be able to generate sufficient heat to uniformly heat the mass of the die face. Heating coil 34, as shown in FIG. 4, is positioned in a serpentine manner about openings 32 within the back of the die heating plate so as not to block the openings 34. This arrangement allows extruded paste to pass from orifices 25 through openings 34 without interference. Serpentine positioning is not critical, but it is desirable to arrange heating coil 34 in this way so that it occupies significant area allowing for maximum distribution of heat without blocking openings 32. Any arrangement that accomplishes this result is desired. For example, a core heater or the like can be used.

Electrical resistance coil 34 has two leads 35 and 37 which may pass through heating die plate 26 as shown. These leads are connected to an electrical power supply (not shown).

It is, of course, necessary to electrically insulate the heating coil 34 from the die heating plate as it passes through the die heating plate to prevent losses in resistance. Insulating structure for this purpose includes mica tape with a polytetrafluoroethylene-treated overbraid known in the art.

In addition, it is necessary to separate heating coil 34 from the die face and die heating plate. Failure to insulate the coil from other metal parts will result in a drastic drop in resistance and a reduction in the heating capacity of the coil. Therefore, the coil is embedded in a non-electric conductive heat transfer material such as a furnace retort composition or a cement composition resistant to thermal shock. The composition, however, must be pottable and have excellent mechanical bonding characteristics. In addition it must be easily removable when it becomes necessary to either replace the coil or clean the apparatus for sanitary or health reasons. A product satisfying the above criteria is sold by Omega Engineering, Inc., of Stamford, Conn., under the trademark OMEGABOND 600 or OB-600.

Essentially OB-600 is a powder and it is mixed with water to create a composition having a consistency such that it can be troweled onto the coil and layered so as to electrically insulate the coil.

When the heat transfer non-electrically conductive cement is dry or set the die heating plate is mounted to the face of the die as shown in FIG. 5. Specifically, the back end 30 of the die heating plate as shown in FIGS. 2 and 5 is mounted to die face 22. When the die heating plate 26 is positioned on die face 22, openings 32 are superposed over orifices 25. Because openings 32 are larger in dimension than orifices 25, orifices 25 are readily viewed by looking through opening 32 as shown in FIG. 6.

Supplying a current to the resistance heating wire heats the die heating plate to above the normal operating temperature of the die; the heating plate 26 will, by radiation and conduction, uniformly increase the temperature of the mass of the die face and the lands of the die. This heating of the die face and die raises the temperature of the extruded paste facilitating extrusion of the alimentary paste.

In a pilot study using the die described above, a single orifice die having two-inch deep lands of uniform cross section was connected to Mapimipianti GF20 extruder.

Extruder conditions and die heating plate conditions were maintained as set forth in Table 1 below.

TABLE I

HEATED DIE RUNS GBRC-AUGUST 2, 3, 4, 1994

| Run | Current (Amps on Heater) | Force (Volts on Heater) | Dough Temp into Die | Pressure (bars) | Motor Amps | Exit Dough Temp | Barrel Temp | Rate (lb/hr) | % Cooking Loss | Hedonic (1–5)* | Heating Die Plate Temp. |
|---|---|---|---|---|---|---|---|---|---|---|---|
| 1 | 0 | 0 | 120° F. | 148 | 5 | 124° F. | 120° F. | 27.5 | 8.9 | 3.5 | Control |
| 2 | 6 | 16 | 126° F. | 132 | 4-5 | 147° F. | 120° F. | 33.2 | 9.7 | 4.0 | 160° F. |
| 3 | 12 | 27 | 127° F. | 130 | 4-5 | 172° F. | 120° F. | 34.5 | 12.8 | 1.5 | 206° F. |
| 4 | 0 | 0 | 96° F. | 208 | 5-6 | 108° F. | 83° F. | 24.1 | 8.9 | 2.7 | Control |
| 5 | 3 | 7 | 102° F. | 198 | 5-6 | 116° F. | 83° F. | 26.5 | 8.5 | 2.8 | 130° F. |
| 6 | 6 | 15 | 105° F. | 192 | 5-6 | 127° F. | 83° F. | 29.1 | 8.7 | 3.3 | 160° F. |
| 7 | 0 | 0 | 120° F. | 175 | 7 | 137° F. | 120° F. | 29.8 | 9.3 | 2.0 | Control |
| 8 | 3 | 8 | 124° F. | 173 | 7 | 143° F. | 120° F. | 32.3 | 9.9 | 2.5 | 160° F. |
| 9 | 6 | 15 | 126° F. | 170 | 7 | 154° F. | 120° F. | 35.4 | 10.4 | 3.0 | 200° F. |

Samples #1–6 were run at 30.0% calculated dough moisture.
Samples #7–9 were run at 27.5% calculated dough moisture.
Samples #4–9 were run using a die insert with reduced flow restriction.
*For 1–5 hedonic rating 1 = poor 5 = excellent.

In greater detail run numbers 1, 4 and 7 are control runs. In these three instances, no electrical energy, or other energy source is used to raise the temperature of the die heating plate. In other words the die heating runs 1, 4 and 7 were not influenced by the heating plate.

Pasta dough samples 1–3 had a moisture content of 30.0% and the die heating plate was heated in runs 2 and 3. As shown, increased die heating plate temperatures caused a reduction in the pressure as extruded dough was made more fluid by the increase in dough temperature attributed to the heating die plate. A reduction in the current requirement of the extruder is also exhibited. As shown, pasta production increased for runs 2 and 3 relative to run number 1. Finally, for at least run number 2, a very acceptable hedonic ratio of 4.0 was achieved for the extended pasta.

Although run number 3 showed improved pasta production rates over runs 1 and 2, pasta quality in run number 3 was poorer relative to control (run number 1) and run number 2. This indicates that there may be one or more parameters (dough temperature, heating plate temperature, screw speed, etc.) in addition to heating the die heating plate that must be optimized to obtain overall improved quality pasta during increased production.

Table I also shows that by using the heating plate of the claimed invention pasta production is increased and pasta quality is improved in run numbers 5 and 6 relative to control run number 4.

Runs 7–9 were conducted using pasta having a moisture content of 27.5%. Reduced moisture content increases current demands of the extruded pasta relative to runs 1–6, but has advantages in that pasta sent to the dryer contains less moisture and, therefore, dries faster. Again, as shown, using the heating die plate of the invention pasta is produced at greater rates and it is of improved quality.

Table II shows results of commercial production using the heating die plate 26 of FIG. 3. The heating 26 plate was attached by screwing the die heating plate 26 to the face 22 of the die 20. The orifices of the heating plate 32 are of dimensions allowing for extrusion of lasagna, without the extruded paste touching the walls defining the openings 32 of the die heating plate 26. A control test included the die heating plate 26 attached to the die face 22, but it was not heated by an outside or independent heating source.

process. It is at this time that temperature and humidity changes in the drying chamber fluctuate considerably and are least uniform. "Checking" observations were made on pasta samples produced conventionally, i.e., without the heating plate (samples A–H) and on samples produced with the aid of an activated heating die plate (samples I–J). After thirteen weeks, at 100° F., under dry conditions (approximately 0% humidity) all samples were subjected to 90° F. at 75% R.H. for four days and then held at room conditions for three days. Obviously, these extreme conditions were designed to test for checking based on a worst-case scenario. See Table IV.

TABLE II

HEATED DIE RUNS

| TESTS | MOTOR AMPS | PRODUCT TEMP. | % RECYCLE | RATE per/hr. | % DOUGH MOISTURE | % CHANGE IN RATE | % CHANGE IN RECYCLE | % COOKING LOSS |
|---|---|---|---|---|---|---|---|---|
| CONTROL | 53.1 | 115° F. | 21% | 917 | 32.5% | 0 | 0 | 5.49% |
| TEST 1 | 53.7 | 115° F. | 17.5% | 993 | 32.4% | 7.7% | −16.7% | 6.06% |
| TEST 2 | 55.8 | 117° F. | 14% | 1050 | 31.9% | 12.7% | −33.3% | 6.06% |
| TEST 3 | 56.2 | 120° F. | 18% | 1000 | 31.6% | 8.3% | −14.3% | 6.69% |
| TEST 4 | 50.8 | 116° F. | 20% | 1063 | 32.8% | 13.7% | −4.8% | 6.24% |

Tests numbered 1–4 were conducted by varying the current supplied to the heating die plate. As shown the heating plate improved production, reduced pasta recycle and produced a better quality pasta relative to the control sample. Of course, the control test was conducted without activating or supplying current to the heating die plate.

Table III below is a report of the thickness (top and bottom) of a length of lasagna. The result for the control is not reported. As shown, the thicknesses obtained for Test Samples 1–4 are within acceptable tolerances of the industry.

TABLE III

HEATED DIE RUNS
AVERAGE LASAGNA THICKNESS AND
LENGTH ON STICKS

|  | TEST 1 | TEST 2 | TEST 3 | TEST 4 |
|---|---|---|---|---|
| AVERAGE LASAGNA THICKNESS TOP (0.001") | 50.6 | 48.4 | 47.4 | 46.3 |
| AVERAGE LASAGNA THICKNESS BOTTOM (0.001") | 52.8 | 54.0 | 53.8 | 52.7 |
| AVERAGE LASAGNA THICKNESS TOTAL (0.001") | 51.7 | 51.2 | 50.6 | 49.5 |
| AVERAGE LASAGNA THICKNESS DIFFERENCE (0.001") | 2.2 | 5.6 | 6.4 | 6.4 |
| AVERAGE LASAGNA LENGTH (1") | 20.7 | 20.6 | 20.8 | 20.5 |

It has also been observed that in using the heating plate of the invention, as described, the phenomena known as checking is lessened, ameliorated or eliminated during pasta storage. Checking refers to product crumbling or disintegration during storage when pasta looses or gains moisture. The phenomena is exacerbated by poor extrusion, drying or storage conditions and the phenomena is observed, most frequently, in pastas at the beginning and end of an extrusion

TABLE IV

LENGTH OF TIME STORED-WEEKS
A = Accept; F-Failed; UT = Under Test

|  |  | Storage Temps 100/Dry |
|---|---|---|
| A | New Hope Spaghetti, Variable 101 Low Temperature Dryer, 100% Semolina | F-13*1 |
| B | New Hope Spaghetti, Variable 110 Low Temperature Dryer, 100% Regrind | F-13*1 |
| C | New Hope Spaghetti, Variable 111 Low Temperature Dryer, 100% Flour | F-13*1 |
| D | New Hope Spaghetti, Variable 321 High Temperature Dryer, 100% Semolina | F-13*1 |
| E | New Hope Spaghetti, Variable 330 High Temperature Dryer, 100% Regrind | F-13*1 |
| F | New Hope Spaghetti, Variable 331 High Temperature Dryer, 100% Flour | F-13*1 |
| G | Crescendo Spaghetti | F-13*1 |
| H | Buffalo Lasagna, Control | F-13*1 |
| I | Buffalo Lasagna, Test 1 | F-13*1 |
| J | Buffalo Lasagna, Test 2 | A-13*2 |

*1 After 13 weeks at 100°, dry samples were transferred to 90° F./75% RH for 4 days, then held at RT for 3 days. All products failed due to checking; however, the checking was not as evident on J sample as on samples A–I.
*2 Borderline checking observed.

All of the pasta experienced checking; however, checking in sample J was not as evident as it was on samples A–I. Sample J is evidence that checking is significantly improved using the device of the claimed invention. The die heating plate of the invention, positioned on or in front of a die face appears to create storage stability. It is speculated that sample I did not exhibit improved checking because extreme storage conditions were employed. It is speculated that Sample I would exhibit improved checking results, relative to samples A–H, if it were exposed to less extreme conditions.

It is noted that other heating devices may be substituted for the heating coils of the die heating plate. Such devices may include a heated water jacket or heated pipes in contact with the die heating plate or by directing hot air over the die.

heating plate. It is also contemplated that auxiliary or additional heaters may be used in association with other parts of the die for heating the die or portions of the die defining lands or orifices of the die.

In summary the die heating plate of the invention saves on the wear and tear of expensive extruding equipment, it eliminates the uneven extrusion rate of extruding alimentary paste, it improves checking qualities, it is easy to fabricate and install, and allows for the easy retrofit of existing pasta extruders. It also produces savings in power requirements.

Having described the subject matter of the present invention, it should be apparent that many substitutions, modifications and variations of the invention are possible in light of the above teachings. It is therefore to be understood that the invention as taught and described herein is only limited by the appended claims.

What is claimed is:

1. A method for extruding alimentary paste at a substantially uniform rate through a die having a front extrusion die face, to eliminate the requirement of having to periodically cut distal extruded ends of the paste during the extrusion process to create uniform pasta lengths, comprising: maintaining the extrusion die face, for creating shaped alimentary paste, at a substantially constant temperature, and extruding the alimentary paste through the die and the die face at a substantially uniform rate to form shaped pasta products having uniform lengths.

2. The method of claim 1, wherein the die face is uniformly heated.

3. The method of claim 1, comprising placing means for generating heat in front of the die in the direction of extrusion in heat exchange relationship with the die so that shaped paste is heated at the point of its extrusion.

4. The method of claim 3, wherein said means for generating heat includes an electrical resistance heater.

5. A method for improving checking of pasta, comprising:

extruding alimentary paste to form a pasta through a die, said die having a front die face;

heating the die face with a heated plate in heat exchange with the die face, said front die face having a plurality of lands formed therethrough and terminating in a plurality of orifices at said front die face, said heated plate having a front face and an opposite rear face, said heated plate being mounted on said die with its rear face disposed in abutting facing relationship to said front die face, said heated plate having a plurality of openings formed therethrough superposed over said orifices and being similar in number and shape to said orifices but larger in dimension, and heating means disposed adjacent the rear face of said heated plate attached;

and drying said pasta.

* * * * *